United States Patent [19]

Stout et al.

[11] Patent Number: 4,922,339

[45] Date of Patent: May 1, 1990

[54] MEANS AND METHOD FOR VISUAL SURVEILLANCE AND DOCUMENTATION

[75] Inventors: Glen R. Stout, Cedar Rapids; Dennis Herrick, Toddville, both of Iowa

[73] Assignee: Stout Video Systems, Cedar Rapids, Iowa

[21] Appl. No.: 176,258

[22] Filed: Mar. 31, 1988

[51] Int. Cl.5 ......................... H04N 7/18; H04N 5/04

[52] U.S. Cl. .................................... 358/108; 358/107; 358/149; 340/937

[58] Field of Search ................. 358/107, 108, 101, 93, 358/149; 340/937

[56] References Cited

U.S. PATENT DOCUMENTS

| | | | |
|---|---|---|---|
| 3,935,380 | 1/1976 | Coutta | 358/108 |
| 4,054,752 | 10/1977 | Dennis, Jr. et al. | 360/9.1 |
| 4,120,004 | 10/1978 | Coutta | 350/108 |
| 4,145,715 | 3/1979 | Clever | 358/108 |
| 4,147,715 | 3/1979 | Clever | 358/108 |
| 4,237,483 | 12/1980 | Clever | 358/108 |
| 4,268,858 | 5/1981 | Wood | 358/108 |
| 4,337,482 | 1/1982 | Coutta | 358/108 |
| 4,462,045 | 7/1984 | Norris | 358/93 |
| 4,498,103 | 2/1985 | Aschwanden | 358/148 |
| 4,578,665 | 3/1986 | Yang | 358/108 |

OTHER PUBLICATIONS

Yeich, Jr., "Automatic Article Counter", Technical Digest, No. 37, pp. 39–40 (Jan. 1975).

*Primary Examiner*—John K. Peng
*Attorney, Agent, or Firm*—Zarley McKee, Thomte, Voorhees & Sease

[57] ABSTRACT

A system for visual surveillance and documentation of an event or events including one or more cameras to visually record the event, and a monitoring member or transducer to derive information regarding the event. The visual representation of the event is contained in a video signal, whereas the information is contained in an information signal. A conversion device operates on the information signal to convert it into a format which is integratable with the video signal. The video and information signals are then combined or integrated into a combining device which outputs a third composite signal containing both the visual recording and the information. The third signal can then be recorded, displayed, or otherwise utilized to document the event, and neither the visual or information portions can be independently altered, thereby increasing validity and reliability of the documentation.

7 Claims, 3 Drawing Sheets

MEANS AND METHOD FOR VISUAL SURVEILLANCE AND DOCUMENTATION

BACKGROUND OF THE INVENTION a. Field of the Invention

The present invention relates to surveillance documentation systems, and in particular, to a means and method for visual surveillance and documentation.

b. Problems in the Art

Advances in electronic surveillance and monitoring equipment and methods have spurred development of components and processes which facilitate such surveillance efficiently and economically. Many of the components can operate at least semi-automatically, and some systems can monitor continuously over long periods of time, or for selected sample intervals.

In particular, visual surveillance technology has advanced to the point where it is cost-effective for many different types of situations. Visual verification is the closest thing to "eye-witness" documentation available. Visual surveillance can be monitored as the event happens, or can be recorded for later analysis or retention.

Many times it is desirable to not only have a visual surveillance monitoring system but also include non-visual information about the event. A common example of desired non-visual information would be time and date of the event. Obviously, other information such as description of the event, place of the event, and quantitative or qualitative data, or identification of the event might also be desirable.

Examples of areas where such surveillance documentation systems are or might be used include verification and documentation of commercial transactions; surreptitious surveillance for crime enforcement, investigation, or documentation; research recording and analysis; identification and verification procedures; educational presentation productions; medical monitoring; and manufacturing process control.

A number of systems have been attempted and are currently in use which try to fill these needs. For example, some systems utilize conventional video cameras and video tape recorders (VTR's) to visually record an event. It is common to superimpose time and date information onto the video record.

Other systems attempt to superimpose other information onto the video record. For example, video cameras will record a cashier's station in a grocery checkout line, and have components which will convert information such as food item price and identification into a signal which would then be contemporaneously superimposed on any video record of the sales being made.

Still further systems take the visual camera recording of the event, and then overlay or create a split screen to show another event, or to display other information regarding the event.

While such systems have proven to be manageable and acceptable to some, there are still deficiencies which can impact on the reliability and verification value of the systems. It is many times crucial to establish that the non-visual information obtained actually correlates to the visual record of the event obtained. In present systems, there exists a danger that this correlation can be altered. Because present systems simply overlay or superimpose the non-visual information (contained in a separate signal) over the visual record which is recorded or displayed, there is always the chance that either the visual record signal or the information signal can be tampered with, altered, or otherwise modified to destroy this correlation.

An example of this danger is seen in the following illustration. In commercial transactions where vehicles carrying a commodity are weighed, and then payment is made on that basis, it is crucial that any surveillance system establish that the visual picture being recorded corresponds to the weight of the commodity being paid for. In systems where only a visual record is recorded, losses are many times experienced when a dishonest scale operator, working with the vehicle driver, report an inaccurate weight. In systems where the weighing process is visually recorded, and the weight is obtained and superimposed on the video record, a dishonest scale operator could alter the weight reading, or otherwise modify the signal being superimposed. Furthermore, a dishonest monitoring employee could potentially alter either the visual image or the weight reading because they are two separate dissociable signals.

Problems as this are of such a serious nature that millions of dollars per year are lost by persons and companies involved in these types of retail or commercial transactions.

In other examples, surveillance of warehouses, cargo loading, shipping docks, and commodity conveying systems also run the risk of having incomplete surveillance documentation, or having that documentation altered without substantial difficulty.

Therefore, a specific need in the art is to have surveillance documentation which contains not only a visual record of an event, but also non-visual information, both of which can be documented with a high probability of correlation, and which cannot be easily altered.

It is therefore a principal object of the present invention to provide a means and method of visual surveillance documentation which solves or improves over the problems and deficiencies in the art.

Another object of the present invention is to provide a means and method as above described, which provides highly verifiable visual surveillance and documentation of an event or events.

A further object of the present invention is to provide a means and method as above described, which allows combined visual and non-visual information of an event to be documented in an integrated form.

Another object of the present invention is to provide a means and method as above described, which is highly resistant to any tampering or alteration of its surveillance documentation.

A further object of the present invention is to provide a means and method as above described which is flexible and adaptable to many varied and different uses.

Another object of the present invention is to provide a means and method as above described which can take many forms and embodiments and still retain high verification.

Another object of the present invention is to provide a means and method as above described which will significantly increase deterrence of stealing, or alteration of results with respect to surveilled events.

Another object of the present invention is to provide a means and method as above described which can provide visual surveillance and documentation continuously over long periods of time, and for selected time intervals.

Another object of the present invention is to provide a means and method as above described which is easy to operate, efficient, economical and long-lasting.

These and other objects, features, and advantages of the present invention will become more apparent with respect to the accompanying specification and claims.

SUMMARY OF THE INVENTION

The present invention comprises a system for visual surveillance and documentation of an event. A camera means, producing a first signal representing a camera picture, is sent to a control means. A second signal containing information from a monitoring or transducer means, that is, information of a non-visual nature about the event, is converted to a format which is integratable with the first signal. The control means then combines the first and second signals in an integrated form to produce a third signal. The third signal is then available to be displayed, recorded, or otherwise documented.

The deficiencies in the art are overcome by the production of the third signal in integrated form. Tampering or alteration of either the visual or informational components of the third signal cannot be independently accomplished. In other words, if either is attempted to be altered, the entire signal would be affected, making the alteration much more susceptible of detection.

The third signal represents a synchronized, merged, and consolidated record of both visual and informational components of the event. It is therefore highly verifiable and reliable. Additionally, the means and method to accomplish the invention are efficient, economical, and easily implemented. A further advantage is the flexibility and adaptiveness of the invention to different uses.

DETAILED DESCRIPTION OF THE PREFERRED EMBODIMENT

Figure 1:
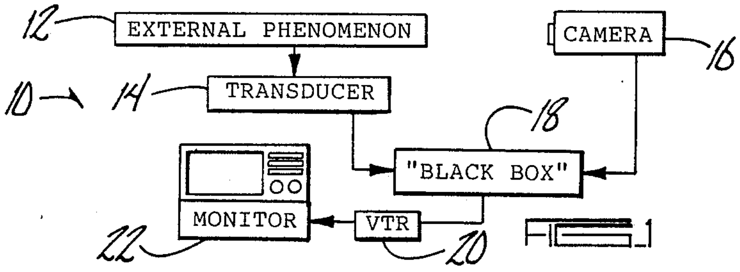
FIG. 1 is a schematic of a combination according to the invention.

With reference to the drawings, the preferred embodiments of the present invention will now be described to help in an understanding of the invention. Parts will be identified by reference numerals. Like reference numerals will be used for like parts in all of the drawings. It is to be understood that the drawings and this description describe preferred embodiments only of this invention, and that other embodiments and combinations can be constructed, while staying within the boundaries of the invention.

With particular reference to FIG. 1, the schematic of a general embodiment of the invention can be seen. In this embodiment, the combination of parts shall be referred to collectively as embodiment or invention 10. An external phenomenon (referred to with reference numeral 12) is desired to be measured and monitored by a transducer 14 and a camera 16. Both transducer 14 and camera 16 send signals to black box 18 which functions to integrate, combine, or otherwise merge those two independent and different signals into a single signal which is then sent from black box to VTR (video tape recorder) 20. VTR 20 records the combined signals to preserve an integrated record of the external phenomenon 12. The combined signal being recorded on VTR 20 can be simultaneously viewed, or viewed at a later time, on monitor 22.

In the preferred embodiments, external phenomenon 12 is the weight of a truck bearing a commodity. However, in its broadest sense, external phenomenon 12 could be any measurable event, with transducer 14 measuring, for example, weight, temperature, pressure, intensity, etc. On the other hand, camera 16 could be replaced with another type of monitoring device which produces a signal which can be merged in black box 18 and then preserved on VTR 20.

It is also to be understood that VTR 20 could contain means for adding additional information to the merged signals. For example, VTR 20 could add a time and/or date stamp, or other information, such as is known in the art. Moreover, there could be input through transducer 14, camera 26, or VTR 20, or there could be variable information input from a keyboard, or other source, according to desire.

The essence of invention 10 is that a variety of monitoring devices can have their signals integrated into one recordable signal, which will avoid tampering or easy alteration, so that an accurate, reliable record can be recorded and monitored.

Black box 18, in the preferred embodiment, can have as its primary component, a signal combiner means. In the preferred embodiment, this can be a device such as or like a Telecomp TM 2000 computer/video combiner, available from Avas ®, 196 Holt Street, P.O. Box 1070, Hackensack, N.J., United States of America 07602. It can combine the appropriately formatted signal from transducer 14 and the composite video signal from camera 16 into a merged signal which is recordable on VTR 20 and available for viewing on monitor 22. Such a device allows either the integration or merging of the two signals, or allows them to be overlayed on one another. It is to be understood that for purposes of the present invention, the best way to prevent tampering or alteration, and preserve accuracy and reliability of the record would be to integrate, merge, or combine signals.

Figure 2:
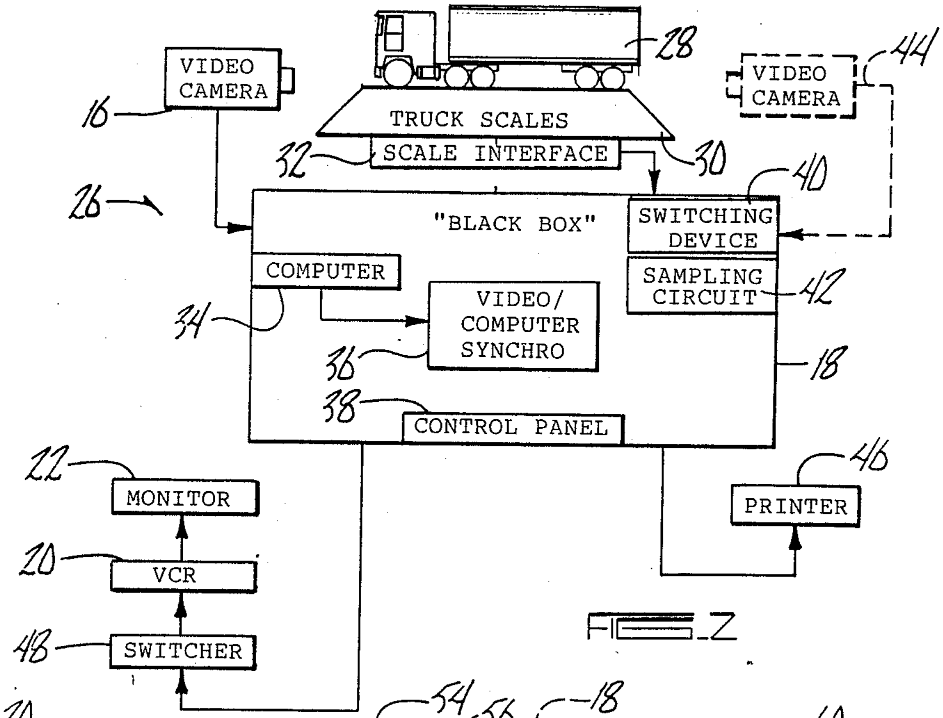
FIG. 2 is a schematic of another combination according to the invention.

FIG. 2 depicts another alternative embodiment of the invention. This embodiment will be referred to as embodiment or truck scale surveillance system 26. Like the embodiment of FIG. 1, it also utilizes video camera 16, black box 18, VTR 20, and monitor 22. However, in this specific embodiment, the function of system 26 is to visually oversee truck scales operation while at the same time insuring that the weight data is correlated and combined with the video signal. An accurate and reliable, non-alterable record of truck scales operation could then be accomplished.

In FIG. 2, the external phenomenon is specifically the weight of truck 28. The transducer is truck scales 30 together with a scale interface 32 which converts the readings of truck scales 30 into an electrical signal which is sent to black box 18. In the embodiment of FIG. 2, black box 18 contains computer 34, video/computer synchronizer means 36, control panel 38, switching device 40, and sampling circuit 42. The computer 34 could be a conventional personal computer or microprocessor which could be used for a number of functions. Computer 34 could control the passage of the weighing information from scale interface 32 to synchronizer means 36, it could control operation of the synchronizer 36, or it could control the time lapse operation of video camera 16. It also could provide other functions. In one embodiment, computer 34 could be a small personal computer such as a Commodore 64 or a VIC with added read only memory (ROM) containing its operational instructions.

Video/computer synchronizer means 36 would function to combine or merge the scale interface 32 information with the composite picture from video cameras 16. Synchronizer means 36 again could be the Avas® Telecomp TM 2000 device previously described.

Switching device 40 could be a standard, known in the art, controllable switch which could be useful if a second video camera 44 were used to get another angle of view of truck scales 30 and truck 28. System 26 could then be manually or automatically switched between camera 16 and 44, with the resulting signal always being sent from switching device 42 to synchronizer means 36.

Control panel 38 could be configured, as would be within the skill of one of ordinary skill in the art, to operate system 26. It could be in the form of a keyboard to enter instructions to computer 34, or otherwise could contain controls to manually operate switching device 40, sampling circuit 42, or synchronizer means 36.

Sampling circuit 42 could be a type of interface means, if needed, to adequately prepare signals from either scale interface 32, or other state of the art digital or analog device, for the by synchronizer means 36. In other words, if synchronizer means 36 requires a certain format for electrical signals, sampling circuit 42 could be configured to format the signals from scale interface 32 appropriately. Alternatively, if one of the video cameras required pre-processing before it could be read and understood by synchronizer means 36, that function could be accomplished.

System 26 also could optionally have a printer 46 which could provide hard copy of any of the non-visual information being received by black box 18. For example, it could print out each reading from scale interface 32. It also could print out any information entered through computer 34 from control panel 38.

System 26 could also contain a switcher 48 in series between black box 18 and VTR 20. Switcher 48 would function to be able to intermittantly operate VTR 20, or select from different outputs from black box 18. For example, direct lines from video cameras 16 and 44 could be entered into switcher 48 for direct viewing on monitor 22.

VTR 20 and monitor 22 operate in the same manner as described with regard to system embodiment 10 of FIG. 1. VTR 20 could also put a time/date stamp on any record of the combined video visual images and the scale measurements. Monitor 22 in any of the embodiments can be an analog RGB or composite video monitor, such as are known in the art.

It can therefore be seen that system 26 would accomplish the goals of the invention, and yet would be very flexible for a variety of different uses, and a variety of different procedures. For example, the system could be operated to continuously monitor truck scales 30, or only be automatically started upon the entry of each truck 28 on truck scales 30. The system could also automatically time-lapse record the operation of truck scales 30, and depending on what is stored in computer 34, could add additional information about each weighing of each truck 28. It could also require each operator to identify himself/herself, or add any other specific parameters or information regarding each truck 28. All this information would be merged, combined, and reliably verified in a final recorded videotape; while at the same time allowing remote viewing or monitoring at monitor 22.

Figure 3:
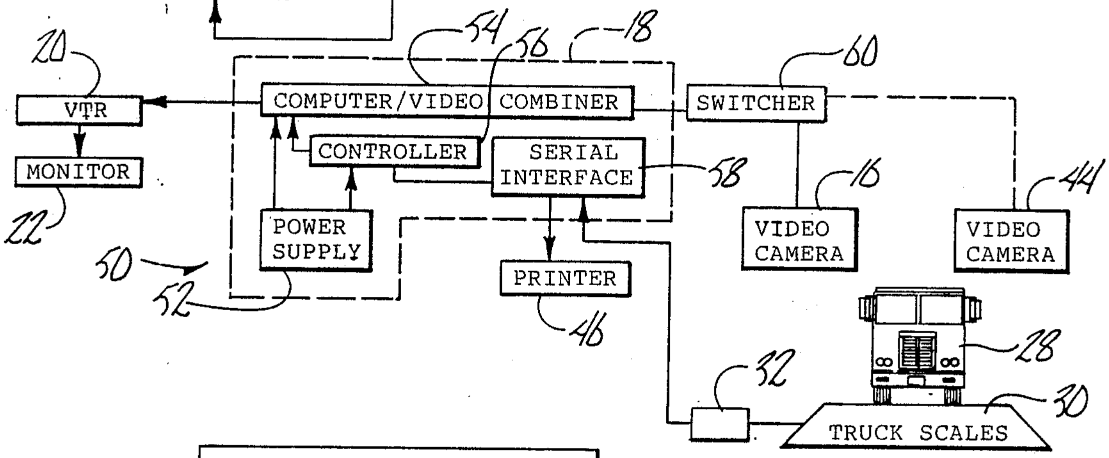
FIG. 3 is a further schematic of an embodiment according to the present invention.

FIG. 3 shows another system or embodiment 50 for the present invention. Embodiment 50, for purposes of example, also is depicted as a truck scale surveillance system utilizing truck scales 30, scale interface 32, video camera 16 (with optional video camera 44), VTR 20, monitor 22, and printer 46. In embodiment 50, black box 18 contains a power supply 52, a computer/video combiner 54, a controller 56, and a serial interface 58. A switcher means 60 is also utilized for switching between video cameras 16 and 44, if camera 44 is used.

In embodiment 50, camera 16 and camera 44 again visually monitor the operation of truck scales 30. The composite video signals are sent to switcher 60 which then controls the input of one of those camera signals to combiner 54.

Scale interface 32 takes the reading of truck scales 30 regarding truck 28 and sends an electrical signal to serial interface 58 which converts it to an appropriate form to send to controller 56. Controller 56 then prepares it for sending to combiner 54. Again, printer 46 can take the signals directly from scale interface 32, as they are passed through serial interface 58, and print out the information from truck scales 30 passed by scale interface 32, if desired. Printer 46 can be of any type, known within the art, that can make a printed hard copy of the information sent from scale interface 32.

Both combiner 54 and controller 56 are powered by power supply 52. In embodiment 50, the power supply 52 can be portable electrical power generating means, if needed, but in most cases, is a transformer which transforms regular household electrical power to a form usable by combiner 54 and controller 56. It is to be understood, of course, that the video cameras, truck scales, scale interfaces, VTR's, and monitors also generally operate from conventional electrical power.

Embodiment 50 functions to select, automatically or by manual direction, the desired visual video signal from camera 16 or 44 and to prepare and input the corresponding weighing information from truck scales 30 to computer/video combiner 54. The combined signal is then sent to VTR 20 where it is recorded, and optionally can be time/date stamped. VTR 20 again could be the Avas® Telecomp TM 2000 device. Monitor 22 would also again allow playback of the recorded videotape, or allow real time monitoring of the weighing process of scales 30 as it is being recorded.

Figure 4:
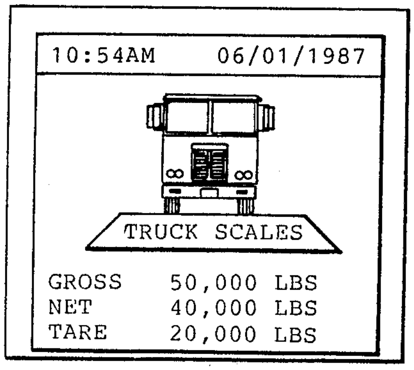
FIG. 4 is a schematic depiction of a composite video picture according to the present invention.

FIG. 4 depicts schematically one embodiment of the combined recorded information for embodiment 20. As can be seen, in a combined (not overlayed or separate) form, the composite video picture of truck 28 on truck scales 30 is recorded, along with the weighing information derived from scales 30 through scales interface 32. Finally, the time/date stamp from VTR 20 is positioned and recorded. Thus, the weighing process for each truck 28 is visually recorded, the scale information is combined to be unalterably merged with the visual image, and the VTR time and date stamps this recording for a verifiable, non-tamperable record.

Figure 5:
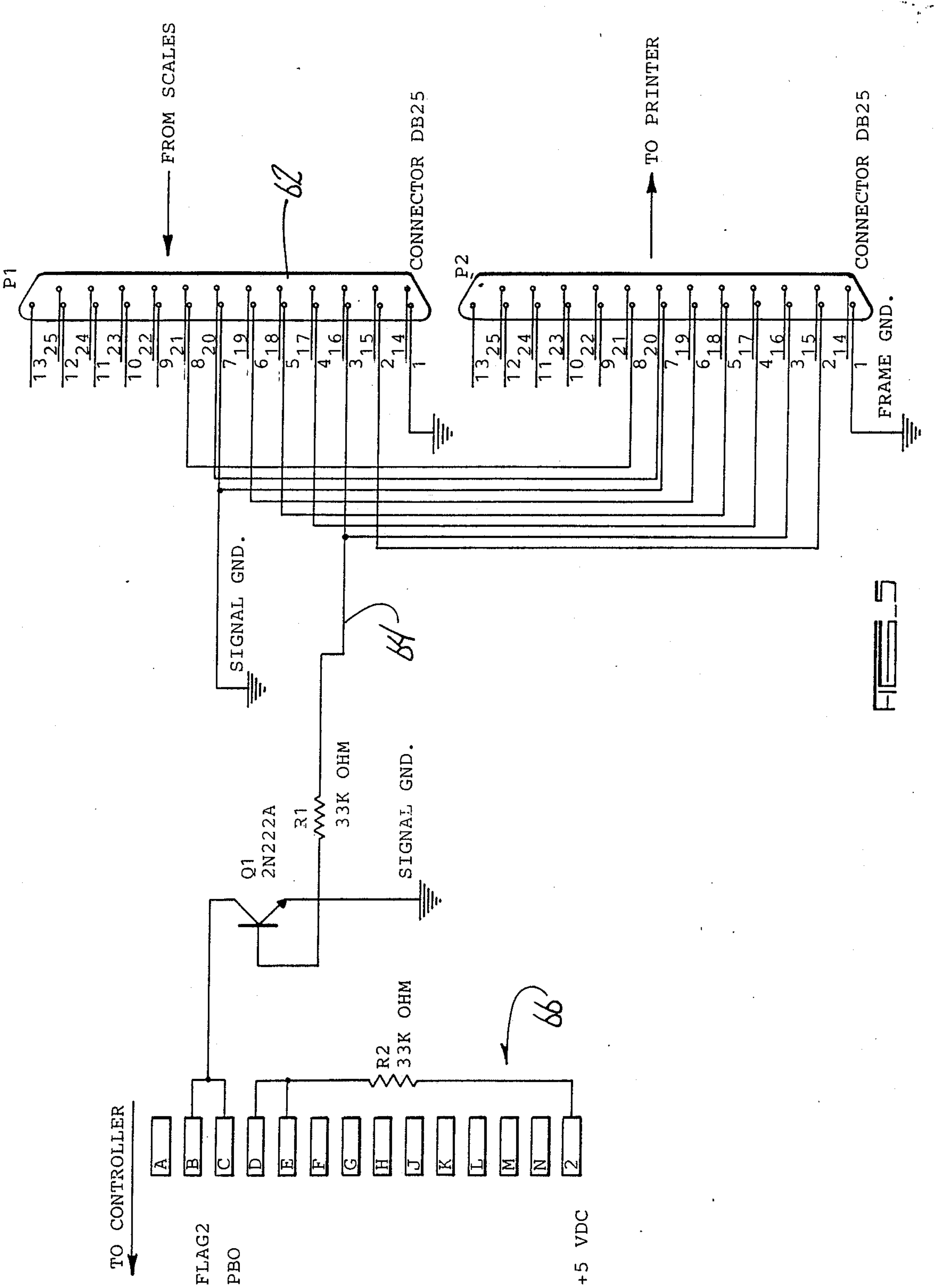
FIG. 5 is an electrical schematic of one embodiment of a serial interface module.

FIG. 5 depicts one embodiment of serial interface 58 as shown in FIG. 3. The purpose of serial interface 58 is to receive the scale signal from scale interface 32 through standard RS-232 cable and connectors, and then convert that information in that signal to TTL logic signals so that they can in turn be conveyed, read, and understood by controller 56. Thus, as shown in FIG. 5, the signal from the scales enters connector 62 and is then conveyed through wire 64, resistor R-1, and transistor Q1, to connectors 66. Such a conversion is well known within the art. The scale data then can leave connector 66 in a serial manner, and in TTL logic.

Figure 6:
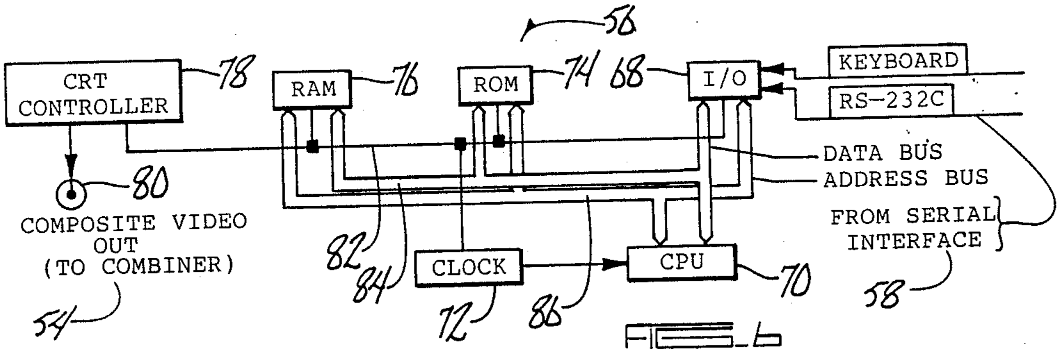
FIG. 6 is a schematic of one embodiment of a controller for the present invention.

FIG. 6 depicts one embodiment of the controller 56 of FIG. 3. Controller 56 is connected between serial interface 58 and computer/video combiner 54. As shown in FIG. 6, signals from serial interface 58 are transferred over an RS-232C cable to I/O (input/output) device 68. It is to be understood that a keyboard or other type of variable data input device could also be connected to appropriately configured and modified additional I/O devies 68 to allow variable additional information to be entered, or to allow control instructions to be given to system 50. Controller 56 also includes a CPU (central processing unit) 70, a clock 72, a ROM (read only memory) 74, a RAM (random access memory) 76, and a CRT controller 78. CRT controller 78 is connectable to computer/video combiner 54 via composite video output 80.

I/O device 68 is directly connected to CRT controller 78 by electrical conduit 82. Additionally, both ROM 74 and RAM 76 are connected into electrical conduit 82.

CPU 70 is connected to each of I/O device 68, ROM 74, and RAM 76 by both data bus 84 and address bus 86. Clock 72 additionally is connected into electrical conduit 82, and CPU 70.

The first function of controller 56 is to convert the serial data from serial interface 58 to parallel data, which is then entered on the data bus 84. ROM 74 is programmable, or contains a program, to operate upon the data carried by data bus 84. The program in ROM 74 converts the data to character pointers which are stored in specific locations in RAM 76. RAM 76 includes a video matrix area comprised of 1,000 consecutive locations of memory, each of which contain an 8-bit character pointer created by a program of ROM 74.

CRT controller 78, upon a clock signal from clock 72, accesses the video matrix of RAM 76 during what are called Phase 1 clock cycles of CPU 70. During phase 2 clock cycles of CPU 70, CPU utilizes data bus 84 and address bus 86.

CRT controller 78 generates a signal called an address enable control (or AEC), which disables address bus drivers in CPU 70. This allows the data stored in RAM 76 to be accessed. CRT controller 78 processes the data and combines it with horizontal and vertical sync to provide a composite video output signal at output 80.

Figure 7:
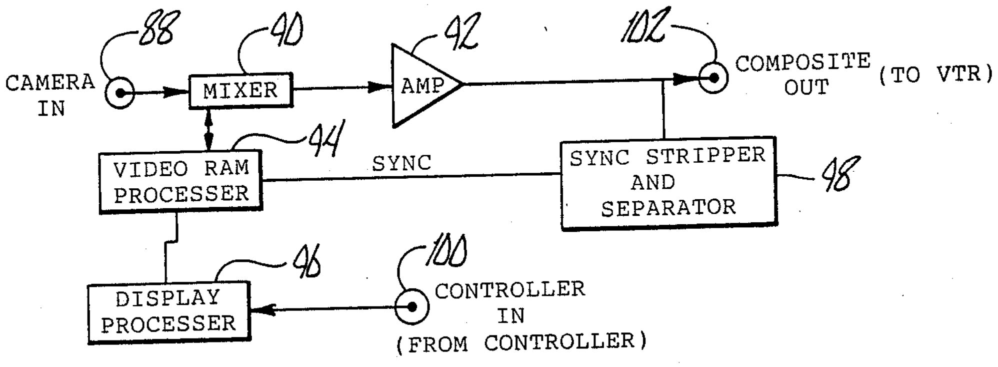
FIG. 7 is a schematic for an embodiment of a computer/video combiner for the present invention.

FIG. 7 depicts an embodiment of a computer/video combiner 54 in FIG. 3. It consists of camera input 88, a mixer means 90, an amplifier 92, a video RAM processor 94, a display processor 96, a sync stripper and separator 98, a controller input 100, and a composite signal output 102.

The signal taken from composite video output 80 of controller 56 is introduced into display processor 96 of computer/video combiner 54. The sync is stripped from this composite video signal. The remaining data is then conveyed to video RAM processor 94.

Likewise, the signals from the video camera received through camera input 88 have their sync stripped and separated and this resulting data is also conveyed to video RAM processor 94. Video RAM processor 94 has obtained the character data from controller 56 and has stored that information. Video RAM processor 94 releases data to mixer 90 in step with the original sync derived from the video camera signal.

Thus, the camera signal and the signal from controller 56 (which includes the scale weight information), are combined with mixer 90, amplified in amplifier 92, and output out of composite output 102 to VTR 20, via 75 ohm coaxial cable. Again, combiner 54 can be the Avas® Telecomp 2000™ device.

VTR 20, in the preferred embodiment, inserts a time/date stamp on the video information and stores the combined composite signals on magnetic tape (such as VCR tape). VTR 20 can be controlled so as to record continuously, intermittently, or for any desired periods. It can be replayed later on monitor 22, or monitored as recorded.

It is to be understood that the preferred embodiments described above are given by way of example only and not by way of limitation to the invention. Variations obvious to one skilled in the art will be included within the invention defined by the claims.

It will be appreciated that the present invention can take many forms and embodiments. The true essence and spirit of this invention are defined in the appended claims.

In the preferred embodiment, any of the video cameras could be a standard NTSC closed circuit television camera employing standard EIA-RS-170 internal sync, which outputs composite 1 Vp black to white 0.65 volts, 0.3 v sync, and requires 75 ohm output termination. no genlocking is required from the video source. A standard 75 ohm coaxial cable can be connected between the video camera and the computer/video combiner.

The printer defined in the invention can be a Serial RS-232 printer. As previously mentioned, the computer/video combiner can be an Avas® Telecomp 2000™. The VTR can be a Panasonic CCTV Model No. AG-6050, one-half inch time lapse video cassette recorder, available through Panasonic Industrial Company, Audio-Video Systems Division, Division of Matsushita Electric Corporation of America, 1 Panasonic Way, Secaucus, N.J. 07094.

The computer/video combiner, the VTR and the monitor can all be connected by 75 ohm coaxial cable, or by other electrical connection means such as are known in the art. Scale interface, serial interface, the controller, and the serial printer can all be connected by standard RS-232 connections. It is also possible to record audio if appropriate equipment is used. Parallel or 20 Milli-Amp Current loop support of the scale interface and printer can also be supported with appropriate interfaces, such as are known in the art.

In its various preferred embodiments, it can therefore be seen that the invention meets at least all of its stated objectives.

One embodiment of the software which could be used with the present invention is contained in Appendix A herein. Such a program could control operation of the invention according to desire and is given for example only.

What is claimed is:

1. A surveillance system for monitoring a remote external event comprising:

transducer means positionable at or near the remote external event for deriving information from the external event and converting the information into a remotely generated first signal representing the information;

camera means for visually recording at least a portion of the remote external event and converting the visual recording into a remotely generated second signal representing the visual recording;

first and second cable means for connecting the transducer means and camera means to a tamper-proof, unalterable combined signal producing means, the first and second cable means being of variable and not necessarily corresponding lengths;

the combined signal producing means including, controller means for controlling operation of the tamper-proof and unalterable combined signal-producing means including input means for receiving the first signal from the transducer means, conversion means for converting the first signal from the transducer means into a format which is integratable with a format of the second signal, processing means for processing information in the first signal, directing transfer, recognition, and storage of information regarding the first signal, and software means for facilitating such operation, and memory means for storing information;

combiner means for combining the first and second signals to produce a composite third signal including the information and the visual recording regarding the external event, the combiner means including input means for receiving the second signal from the camera means and for receiving information from the controller means; and a composite third video signal output means for facilitating output of the third signal to at least one of the set comprising a video signal display and a video signal recording means.

2. A system for visually surveilling and documenting a remote event, and incorporating non-visual information regarding the event into visual documentation of the remote event to disallow tampering or alteration of the visual and information documentation comprising:

camera means for generating an electrical picture signal visually recording the remote event;

non-visual information means for generating an electrical information signal recording non-visual information of the remote event;

tamper-proof, unalterable combined signal producing means to which is connected first and second cable means of variable and not necessarily corresponding lengths from the camera means and the non-visual information means;

the combined signal producing means including;

controller means for controlling operation of the tamper-proof and unalterable combined signal producing means including input means for receiving the information signal, conversion means for converting the information signal into a format which is integratable with a format of the picture signal, processing means for processing information in the information signal, directing transfer, recognition, and storage of information regarding the information signal, and including software means for facilitating such operation, and memory means for storing information; and the combined signal producing means including input means for receiving the picture signal from the camera means, and for receiving the information signal from the controller means, and means for integrating the information signal from the controller means and the picture signal from the camera into one integrated composite third video signal, and a composite third video signal output means for facilitating output of the third signal to at least one of the set comprising a video signal display and a video signal recording means.

3. The system of claim 2 wherein the camera signal is in a first electrical signal format.

4. The signal of claim 3 wherein the information signal is in an electrical signal format different from the picture signal format.

5. The system of claim 4 wherein the control means includes a conversion means for converting the information signal into a format which is integratable with a format of the picture signal.

6. The system of claim 5 wherein the conversion means comprises computer means for receiving the information signal, interpreting the information signal, and storing the information signal for processing; computer to video combining means for integrating the information and camera signals and producing an output video signal of that integration adaptable for recording and display.

7. The method of visual surveillance documentation of a remote event including incorporation of non-visual information regarding the event to disallow tampering of alteration of the visual information documentation of the event comprising:

visually recording the remote event;

converting the visual recording into a first signal;

monitoring the event to derive non-visual information;

converting the non-visual information into a second signal;

electrically communicating the first and second signals by cable means of variable and not necessarily corresponding lengths;

controlling the second signal by utilizing a controller means which includes processing means, memory means, and software means;

converting the second signal into a format which is integratable with the first signal in the controller means;

combining the first and second signals into a third signal by utilizing a combiner means which receives the first signal including the visual recording of the event, and by synchronizing the first signal and the second signal and then integrating the first and second signals after synchronization and combination to produce a tamper-proof unalterable composite third signal output; and adapting the third signal for display and documentation.

* * * * *